US010738473B2

(12) United States Patent
De Ridder et al.

(10) Patent No.: US 10,738,473 B2
(45) Date of Patent: Aug. 11, 2020

(54) SOLAR SHADING MODULE, GLAZED STRUCTURE, BUILDING, AND METHOD OF OPERATING A SOLAR SHADING MODULE

(71) Applicant: SOLARSWING ENERGY B.V., Delft (NL)

(72) Inventors: Christiaan Martinus Petrus De Ridder, Delft (NL); Sam Kin, Amsterdam (NL); Lucas Johannes Cornelis Kouters, Amersfoort (NL); Job Leonardus Kneppers, Den Hoorn (NL)

(73) Assignee: SOLARSWING ENERGY B.V., Delft (NL)

( * ) Notice: Subject to any disclaimer, the term of this patent is extended or adjusted under 35 U.S.C. 154(b) by 0 days.

(21) Appl. No.: 15/779,365

(22) PCT Filed: Nov. 28, 2016

(86) PCT No.: PCT/NL2016/050837
§ 371 (c)(1),
(2) Date: May 25, 2018

(87) PCT Pub. No.: WO2017/091077
PCT Pub. Date: Jun. 1, 2017

(65) Prior Publication Data
US 2018/0320382 A1  Nov. 8, 2018

(30) Foreign Application Priority Data
Nov. 27, 2015  (NL) ...................... 2015879

(51) Int. Cl.
*E04F 10/10* (2006.01)
*H02S 20/32* (2014.01)
(Continued)

(52) U.S. Cl.
CPC .............. *E04F 10/10* (2013.01); *E06B 7/086* (2013.01); *F24S 20/66* (2018.05); *F24S 20/67* (2018.05);
(Continued)

(58) Field of Classification Search
CPC ...................................................... F21S 11/00
(Continued)

(56) References Cited

U.S. PATENT DOCUMENTS 2,602,972 A * 7/1952 Chalfant ................. E04F 10/10
 49/86.1
4,191,165 A   3/1980 Faudarole
(Continued)

FOREIGN PATENT DOCUMENTS

CN     204282680 U    4/2015
EP      02540708 A1   5/1993
(Continued)

OTHER PUBLICATIONS

PCT International Search Report and Written Opinion dated Mar. 14, 2017 for PCT Patent Application No. PCT/NL2016/050837 (14 Pages).

*Primary Examiner* — Clayton E. LaBalle
*Assistant Examiner* — Kevin C Butler
(74) *Attorney, Agent, or Firm* — Schroeder Law PC

(57) ABSTRACT

This invention relates to a solar shading module (1) for shading direct sunlight, wherein maximum shading is combined with a high unobstructed view factor by providing an array of m×n shading panels (5) which are moved by a solar tracking system (7) in order to follow the sun. The invention further relates to a glazed structure and a building provided with one or more solar shading modules (1) according to the invention, for instance as part of a façade or roof of the building. The invention also relates to a method for operat- (Continued)

ing a solar shading module (1) according to the invention, comprising the step of controlling the position of the shading panels (5) such that the normal of the shading panels (5) points towards the sun.

23 Claims, 6 Drawing Sheets

(51) Int. Cl.
  *H02S 20/21* (2014.01)
  *E06B 7/086* (2006.01)
  *F24S 20/67* (2018.01)
  *F24S 30/45* (2018.01)
  *F24S 20/66* (2018.01)
  *H02S 20/22* (2014.01)
  *F24S 20/00* (2018.01)

(52) U.S. Cl.
  CPC .............. *F24S 30/45* (2018.05); *H02S 20/21* (2014.12); *H02S 20/22* (2014.12); *H02S 20/32* (2014.12); *F24S 2020/183* (2018.05)

(58) Field of Classification Search
  USPC .......................................................... 359/591
  See application file for complete search history.

(56) References Cited

U.S. PATENT DOCUMENTS

| | | | | |
|---|---|---|---|---|
| 5,927,365 | A | * | 7/1999 | Almodovar ............... E06B 9/26 160/168.1 V |
| 10,006,665 | B2 | * | 6/2018 | Maxey .................... F24S 50/20 |
| 2004/0246596 | A1 | * | 12/2004 | Dyson ...................... G02B 3/08 359/742 |
| 2010/0254010 | A1 | * | 10/2010 | Whitehead ........... G02B 17/061 359/597 |
| 2013/0118099 | A1 | * | 5/2013 | Scanlon ................ H01L 31/052 52/173.3 |
| 2013/0192770 | A1 | * | 8/2013 | Murphy, Jr. ............ E04F 10/10 160/5 |
| 2018/0320382 | A1 | * | 11/2018 | De Ridder .............. H02S 20/10 |

FOREIGN PATENT DOCUMENTS

| | | | | |
|---|---|---|---|---|
| EP | 2375186 | A1 | 10/2011 | |
| ES | 2398330 | A1 * | 3/2013 | .............. F21S 11/00 |
| ES | 2398330 | A1 | 3/2013 | |
| FR | 3014925 | A1 | 6/2015 | |
| WO | 01882312 | A1 | 11/2001 | |
| WO | WO-0188312 | A1 * | 11/2001 | ............... E06B 9/04 |

\* cited by examiner

SOLAR SHADING MODULE, GLAZED STRUCTURE, BUILDING, AND METHOD OF OPERATING A SOLAR SHADING MODULE

BACKGROUND OF THE INVENTION

The invention relates to a solar shading module for shading direct sunlight, and to a glazed structure, such as a façade, roof, and sound barrier along a highway, comprising one or more solar shading modules. The invention further relates to a building comprising one or more solar shading modules. The invention also relates to a method for operating a solar shading module according to the invention.

Well-known shading modules usually comprise vertical or horizontal blinds that can be rotated about their longitudinal axis allowing the blinds to be positioned such that preferably all direct sunlight is blocked by the blinds.

However, a drawback of the vertical and horizontal blinds when for instance used in a façade of a building is that the blinds obstruct the view of an observer in many directions, i.e. the unobstructed view factor is relatively low. In other words, the blinds also block much of the indirect light.

To improve the unobstructed view factor, i.e. increase the unobstructed view factor, or in other words to allow more indirect light to pass the shading module, it is possible to provide a solar tracking system allowing the vertical and horizontal blinds to follow the sun thereby ensuring that direct sunlight is effectively blocked while at the same time the blinds are positioned to allow as much indirect light as possible to pass the blinds.

Although the provision of a solar tracking system has led to improvement, the improvement is not sufficient. Hence, there is a need to further improve the shading modules. However, so far, it has been found difficult to improve the unobstructed view factor while at the same time blocking all direct sunlight in substantially all possible positions of the sun.

Patent publication WO01/88312A1 discloses prior art in which shading elements are provided in an m×n array with m and n larger than 1, that are able to track the sun and adjust their position accordingly. However, the unobstructed view factor is still relatively low.

BRIEF SUMMARY OF THE INVENTION

It is an object of the invention to provide a shading module with an improved unobstructed view factor while allowing to block substantially all direct sunlight.

To achieve this object, there is provided a solar shading module comprising:
  a frame;
  an array of m×n shading panels; and
  a solar tracking system configured to move the shading panels in order to follow the sun,
  wherein m and n are integer values larger than 1,
  wherein the shading panels have a length, a width and a thickness, said length being equal to or larger than the width, and said width being at least five times larger than said thickness,
  wherein the shading panels have a back side to face away from the sun, and a front side opposite the back side with a front surface to face towards the sun, said front surface extending in a length direction and a width direction and defining a normal of the shading panel perpendicular to the front surface,
  wherein the shading panels are configured to shade at least visible radiation that is incident to the front surface and parallel to the normal of the respective shading panels,
  wherein the frame comprises one or more support columns supporting multiple shading panels,
  wherein the solar tracking system is configured to rotate the shading panels about a longitudinal axis of the corresponding support columns,
  wherein the solar tracking system is further configured to rotate the shading panels about a rotation axis perpendicular to the longitudinal axis of the corresponding support columns and perpendicular to the normal of the respective shading panels,
  wherein the shading panels each comprise a connecting element to connect the respective shading panel to a corresponding support column in one of the following ways:
  a) in which the connecting element connects a side of the respective shading panel to the corresponding support column such that in case the shading panels are all positioned in a single plane, the support columns are also positioned in said plane, wherein in case more than two support columns are provided a first set of shading panels and a second set of shading panels are arranged in between adjacent support columns, wherein the first set of shading panels is connected to one of the adjacent support columns and the second set of shading elements connected to the other one of the adjacent support columns, or
  b) in which the connecting element extends away from the respective shading panel in the thickness direction of the shading panel such that in case the shading panels are all positioned in a single plane, said plane is at a distance but parallel to a plane spanned by the support columns.

The invention is amongst others based on the insight that the vertical or horizontal blinds need to be replaced by an array of m×n shading panels, and that the solar tracking system needs to rotate the shading panels about two orthogonal axes to improve the unobstructed view factor.

However, to ensure that maximum shading can be or is achieved, the inventors have also found that this can best be achieved by shading panels having a thickness that is much smaller than the width and length of the shading panel, e.g. five times smaller, preferably ten times smaller, more preferably twenty times smaller, and most preferably fifty times smaller. This allows to position the shading panels close to each other and, if applicable, close to support columns without mutual interference during movement of the shading panels by the solar tracking system.

For connection type a), the inventors further realized that positioning shading panels close to adjacent support columns can only be achieved with respect to the support column the shading panels are connected to, so that in between adjacent support columns, two sets of shading panels are required to allow the shading panels to move without interference with adjacent support columns.

An advantage of connection type a) is that the angle of rotation can easily be relatively large making this connection type suitable for integration in both facades and roofs of buildings. Another advantage may be that the applied loads to the support column are lower due to a smaller distance between center of gravity of the shading panel and the support column.

A further advantage of connection type a) may be that frame parts provided at free ends of the support columns can be positioned close to the shading panels as there is no risk of interference between moving shading panels and these frame parts.

An advantage of connection type b) is that frame parts such as the support columns and possibly other frame parts as well can at least be partially hidden behind the shading panels.

For instance, when the frame parts need to be hidden for an external observer, the connecting element may extend away from an upper portion of the back side of the respective shading panel. Hence, seen from the sun side of the solar shading module the shading panels are positioned in front of the support columns. This may also be advantageous when the support columns are carried by frame parts extending away from the shading panels to the shaded side of the shading module for instance for attachment to an inner wall of a building.

Alternatively, when the frame parts need to be hidden for an internal observer, the connecting element may extend away from a lower portion of the front side of the respective shading panel. Hence, seen from the sun side of the solar shading module, the shading panels are positioned behind the support columns. This may also be advantageous when the support columns are carried by frame parts extending away from the shading panels to the sun side of the shading module for instance for attachment to an outer wall of a building.

In an embodiment, when the shading panels are connected to the one or more support columns using connection type a), the in plane distance between shading panels and the in plane distance between shading panels and adjacent support columns are substantially minimal without causing interference during movement of the shading panels by the solar tracking system.

In an embodiment, when the shading panels are connected to the one or more support columns using connection type a), the in plane distance between shading panels and the in plane distance between shading panels and adjacent support columns are maximum 50 mm, preferably maximum 25 mm, more preferably maximum 10 mm, even more preferably maximum 5 mm, and most preferably maximum 1 mm, without causing interference during movement of the shading panels by the solar tracking system.

In an embodiment, when the shading panels are connected to the one or more support columns using connection type b), the in plane distance between shading panels is substantially minimal without causing interference during movement of the shading panels by the solar tracking system.

In an embodiment, when the shading panels are connected to the one or more support columns using connection type b), the in plane distance between shading panels is maximum 50 mm, preferably maximum 25 mm, more preferably maximum 10 mm, even more preferably maximum 5 mm, and most preferably maximum 1 mm, without causing interference during movement of the shading panels by the solar tracking system.

In an embodiment, the in plane distance seen in width direction of the shading panels is different from the in plane distance seen in length direction of the shading panels. This may be caused by a difference in length and width of the shading panels causing a different minimum in plane distance to ensure that the shading panels do not interfere with each other. It may also not be necessary to have the same in plane distance to obtain a similar shading result due to its application.

Hence, in an embodiment, the in plane distance in a certain direction, i.e. length direction or width direction, may alternatively be described as being at most 10% of a dimension of the shading panel in said certain direction, preferably at most 5%, more preferably at most 2%, and most preferably at most 1%.

In an embodiment, for connection type b) the length and width of the shading panels are such that during movement of the shading panels by the solar tracking system, shading panels do not interfere with adjacent support columns. This improves the possible angles of rotation of the shading panels.

In an embodiment, one or more of the shading panels comprise a solar panel to transfer at least visible radiation incident to the solar panel into electricity and/or heat. This has the advantage that the solar shading module can also be used to harvest energy that can be used somewhere else. The generated heat may for instance be used to heat water in a building or the building itself, or may be used to drive natural ventilation.

In an embodiment, one or more of the shading panels comprise a solar panel including an optical element, such as an optical light guide, to guide or focus at least visible radiation incident to the lens and parallel to the normal of the shading panel on a photovoltaic cell to transfer the at least visible radiation into electricity and/or heat. This has the advantage that the photovoltaic cell can be smaller than the lens allowing radiation that is not focused on the photovoltaic cell to pass the shading panel and for instance provide lighting to the interior of a building. Preferably, the optical element is a flat element and the photovoltaic cell can be positioned close to the optical element to allow integration into a flat shading panel.

During use of the solar shading module, tracking of the sun may result in portions of one shading panel lying in the shadow of another shading panel for a certain period of time. Hence, these portions cannot be efficiently used to harvest energy. In an embodiment, a solar panel is only provided in a region of a shading panel which can be illuminated by the sun for more than 50% of the available time over a predetermined period of e.g. a year, preferably for more than 60%, more preferably for more than 70% and most preferably for more than 80% of the available time when tracking the sun.

In an embodiment, the shading panels are configured to allow the passage of radiation with the exception of at least visible radiation that is incident to the front surface and parallel to the normal of the respective shading panels. This has the advantage to allow indirect lighting of for instance the interior of a building.

In an embodiment, the shading panels comprise resilient elements that in case the shading panels are all positioned in a single plane engage with adjacent shading panels and/or engage with the resilient elements of adjacent shading panels in order to prevent the passage of direct sunlight in between the shading panels. 100% shading may be difficult to achieve as the shading panels may not be positioned sufficiently close to each other. Hence, throughout a year, direct sunlight may be able to pass the shading panels a couple of minutes per day for at least a portion of the year, e.g. a maximum of 2 hours, preferably a maximum of 1 hour, more preferably a maximum of 30 minutes, most preferably a maximum of 15 minutes. This can be reduced or eliminated by providing the resilient elements between shading panels.

In an embodiment, the shading panels are connected to the one or more support columns using connection type a), wherein the shading panels comprise a resilient element engaging with the support column they are connected to in order to prevent the passage of direct sunlight in between the shading panels and the support column they are connected to. 100% shading may be difficult to achieve as the shading panels may not be positioned sufficiently close to the respective support columns. Hence, throughout a year, direct sunlight may be able to pass the shading panels a couple of minutes per day for at least a portion of the year, e.g. a maximum of 2 hours, preferably a maximum of 1 hour, more preferably a maximum of 30 minutes, most preferably a maximum of 15 minutes. This can be reduced or eliminated by providing the resilient elements between shading panels and support columns.

In an embodiment, the solar tracking system comprises a first motor and a first transmission system between the first motor and the one or more support columns, so that all support columns are rotatable about their longitudinal axis by driving the first motor thereby rotating the shading panels connected thereto. As a result thereof, efficient use may be made of the first motor and it may be easier to synchronize the motion of the support columns and shading panels connected thereto. Further, actuating the support columns to rotate the shading panels allows to hide the first transmission system in for instance the frame.

In an embodiment, the solar tracking system comprises a second motor and a second transmission system between the second motor and the shading panels, so that all shading panels are rotatable about the rotation axis perpendicular to the respective longitudinal axis of the support column and the normal of the shading panel by driving the second motor. As a result thereof, efficient use may be made of the second motor and it may be easier to synchronize the motion of the shading panels.

In an embodiment, the second transmission system comprises a part that is provided inside the one or more support columns. In this way, the second transmission is at least partly hidden and not able to block direct or indirect light.

In an embodiment, the shading panels are configured to shade the at least visible radiation that is incident to the front surface and parallel to the normal of the respective shading panels by absorbing, reflecting and/or redirection said at least visible radiation. When the radiation is reflected and/or redirected, the radiation may for instance be used to lighten another part of a building, e.g. to provide daylight at a part of a building where no direct daylight can enter.

The invention also relates to a glazed structure and a building comprising one or more solar shading modules according to the invention.

In an embodiment, multiple solar shading modules may be arranged next to each other, wherein the arrangement is configured to cooperate to act as a single solar shading system.

Hence, appropriate measures may be provided to prevent that direct sunlight passes between adjacent modules. This can for instance be done by positioning adjacent modules sufficiently close to each other, or by providing shielding members in between modules, which shielding members may for instance be formed by frame parts.

In an embodiment, the solar shading modules are arranged in a space of the building separate from normal user areas of the building allowing to store heat that is generated by the shading panels for thermal harvesting purposes.

The solar shading modules may be provided at the roof of a building, a façade of the building or any other glazed window envelope of the building.

Glazed structures may also be sound or light barriers that may advantageously be used next to highway.

The invention also relates to a method for operating a solar shading module according to invention, comprising the step of controlling the position of the shading panels such that the normal of the shading panels points towards the sun.

BRIEF DESCRIPTION OF THE DRAWINGS

The invention will now be described in a non-limiting way with reference to the accompanying drawings in which like parts are indicated by like reference symbols and in which.

DETAILED DESCRIPTION OF THE INVENTION

FIGS. 1, 2 and 3A to 3C depict schematically a solar shading module 1 for shading direct sunlight, said module 1 comprising a frame 3, and array of 3 by 4 shading panels 5, and a solar tracking system 7 configured to move the shading panels 5 in order to follow the sun.

Figure 1:
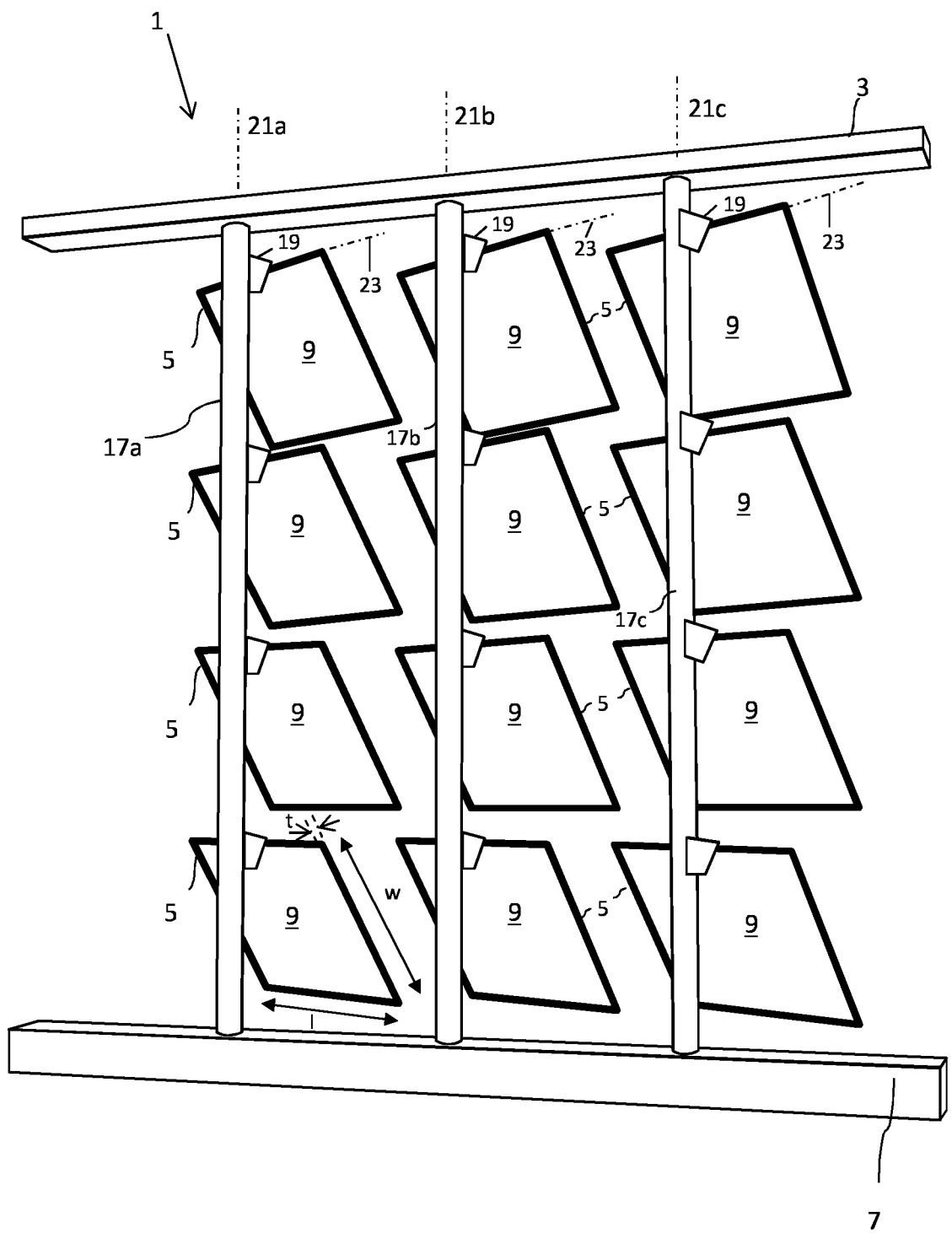
FIG. 1 depicts schematically a perspective view from a shaded side of a solar shading module according to an embodiment of the invention.
Figure 2:
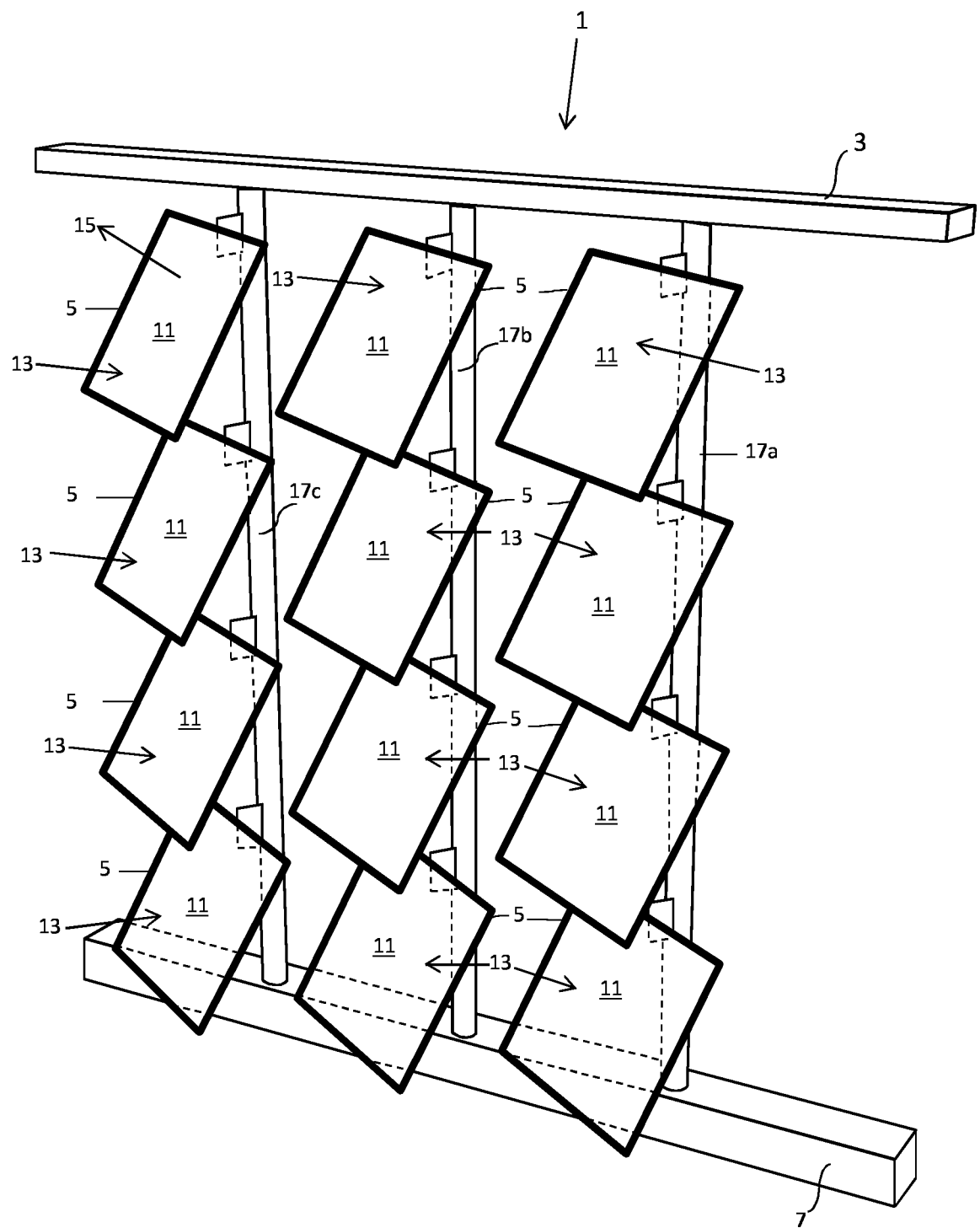
FIG. 2 depicts schematically a perspective view from a sun side of the solar shading module of FIG. 1.
Figure 3:
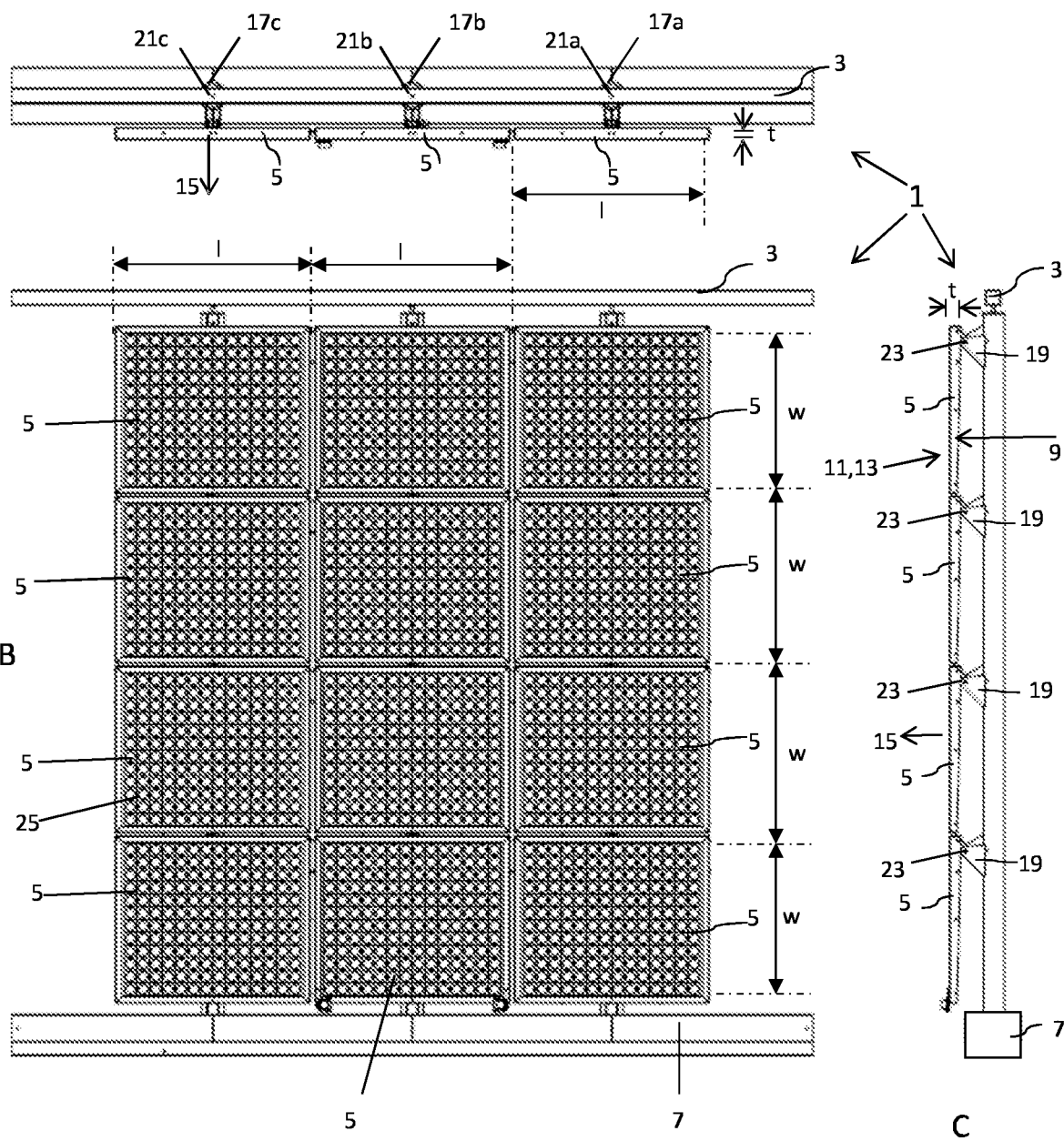
FIGS. 3A-3C respectively depict a top view, a front view and a side view of the solar shading module of FIGS. 1 and 2 with the shading panels positioned in a single plane.

FIG. 1 depicts the module 1 seen from a shaded side of the module 1, while FIG. 2 depicts the module 1 seen from a sun side of the module 1. FIG. 3A depicts a top view, FIG. 3B a front view, and FIG. 3C a side view. In FIGS. 3A, 3B and 3C the shading panels have all been positioned in a single plane in front of the frame 3. In FIGS. 1 and 2, the shading panels have all been rotated similarly.

The array of 3 by 4 shading panels is a mere example. The smallest array falling within the terms of the invention is an array of 2 by 2 shading panels, but the array may also be much larger. For simplicity reasons, the example is chosen to be relatively small. Hence, every practical m×n array can be envisaged with m and n being integer values larger than 1, where it is also possible that m=n.

For one shading panel 5 in FIG. 1 and I FIGS. 3A to 3C it is indicated that each shading panel has a length l, a width w and a thickness t, wherein for this embodiment, the length l is larger than the width w, which in turn is much larger than the thickness t. It is explicitly noted here that the mentioning of the length, width and thickness does not mean that the shading panels have a square or rectangular form. Other shapes of the shading panels are also envisaged, such as polygonal, circular or oval shading panels. For these forms, the terms length, width and thickness refer to the maximum dimensions in three orthogonal directions. It is also not necessary that all shading panels are of the same shape and/or dimensions. However, it is envisaged that the shading panels have shapes that are complementary to the shapes of the adjacent shading panels.

The shading panels have a back side 9 as clearly shown in FIG. 1, which back side is configured to face away from the sun and thus is visible in the view of FIG. 1. The shading panels also have a front side 11 opposite the back side 9, which front side 11 with corresponding front surface 13 is clearly shown in FIG. 2. The front surface 13 extends in a length direction corresponding to the length l and a width direction corresponding to the width w. The front surface 13 also defines a normal 15, only depicted for one shading panel 5 in FIG. 2 that is perpendicular to the front surface 13. The front surface 13 is configured to face towards the sun and is therefore visible in FIG. 2.

In order for the shading panels 5 to block direct sunlight, the shading panels are configured to shade at least visible radiation that is incident to the front surface 13 and parallel to the normal 15 of the respective shading panels 5. This minimum demand is possible due to the provision of the solar tracking system 7, which is configured to move the shading panels in order to follow the sun, i.e. in order to orient the shading panels 15 such that the normal 15 of the respective shading panels 5 point towards the sun. As a result thereof, it is ensured that direct sunlight incident to the shading panels is parallel to the normal and thus blocking radiation parallel to the normal is sufficient for blocking direct sunlight and thus for performing the shading function.

Visible radiation may be defined as the range of wavelengths that is visible to the human eye, which is considered to include wavelengths from about 390 to 700 nm. Alternatively, the visible radiation may be defined as the range of wavelengths causing glare when the solar shading module is mainly used for glare prevention. However, the radiation blocked by the shading panels may also extend to outside the visible range, e.g. to infrared and/or ultraviolet spectrum.

The shading panels 5 are supported by support columns 17a, 17b and 17c of the frame 3. To this end the shading panels each comprise a connecting element 19 (only shown for the top row of shading panels in FIG. 1) to connect the respective shading panels 5 to a corresponding support column 17a, 17b or 17c.

The solar tracking system 7 is configured to rotate the shading panels 5 about a longitudinal axis 21a, 21b, 21c of the corresponding support columns 17a, 17b, 17c they are connected to, for instance by rotating the support columns about their respective longitudinal axis.

The solar tracking system 7 is further configured to rotate the shading panels 5 about a rotation axis 23 (only shown for the top row of shading panels in FIG. 1) that is perpendicular to the respective longitudinal axis of the corresponding support column the shading panel is connected to, and that is perpendicular to the normal 15 of the respective shading panel 5.

In the embodiment shown in FIGS. 1 and 2, the connecting elements 19 extend away from the respective shading panel 5 in a direction corresponding to the thickness t of the shading panels 5, such that in case the shading panels are all positioned in a single plane as shown in FIGS. 3A to 3C, said plane is at a distance but parallel to a plane spanned by the support columns 17a, 17b, 17c, and the in plane distance between shading panels 5 is substantially minimal without causing interference during movement of the shading panels by the solar tracking system.

Substantially minimal does not necessary mean that shading is perfect for all positions of the sun. It is acceptable when for a very limited period of time, e.g. a maximum of 2 hours, preferably a maximum of 1 hour, more preferably a maximum of 30 minutes, and most preferably a maximum of 15 minutes per day, direct sunlight is able to pass the shading panels.

The advantage of this module 1 is that all direct sunlight can substantially be blocked for all positions of the sun, while allowing enough room between shading panels to allow indirect sunlight to pass the shading panels which in turn for the observer on the shading side of the module provides a relatively high unobstructed view factor. This can for instance be clearly seen in FIGS. 1 and 2.

Depending on the geographical location, on average an unobstructed view factor between 30% and 50% can be obtained, which is a significant improvement compared to vertical or horizontal blinds which provide for the same conditions on average an unobstructed view factor between 10% and 30% even when using solar tracking systems.

The unobstructed view factor used in this specification is defined as the area providing an unobstructed outside view as a fraction of total window surface area, which can be calculated using a ray-tracing algorithm developed by J. Bos-Coenraad, Radboud University. In this algorithm, a standard window is defined of width 6.0 meters and height 2.4 meters. In front of this window, a shading system is placed, either being vertical blinds, horizontal blinds or the solar shading module according to the invention. A spectator is then placed at a distance D from the center of the window and at a height of 1.2 meters at the center of the window. For the unobstructed view factors used in this specification, distance D is 4.0 meters.

As an example, the following average unobstructed view factors have been obtained for different geographical locations taken over a period of a year:

|  | Solar shading module according to the invention | Horizontal blinds | Vertical blinds |
| --- | --- | --- | --- |
| Amsterdam | 42% | 11% | 20% |
| Rome | 50% | 15% | 23% |
| Abu Dhabi | 61% | 27% | 30% |

Hence, using the solar shading module according to the invention, results in a significant improvement of the unobstructed view factor compared to horizontal and vertical blinds.

The shading panels 5 may comprise a solar panel. In FIG. 3B each shading panel is shown to comprise a solar panel with multiple optical elements indicated by the circular features 25 on the front surface 13. Each optical element focuses radiation, i.e. at least visible radiation, parallel to the normal of the shading panel on a preferably smaller photovoltaic cell, e.g. arranged on the back of the optical element in the center thereof, to generate electricity and possibly heat. An advantage thereof is that indirect light is not focused on the photovoltaic cell and thus passes the shading panel. Hence, it is possible to see through the shading panels although the image may be blurred due to the lenses. Hence, it is possible during periods in which the sun is not directly shining, e.g. during the night to use the shading panels as privacy glass by positioning them as shown in FIGS. 3A to 3C.

Figure 4:
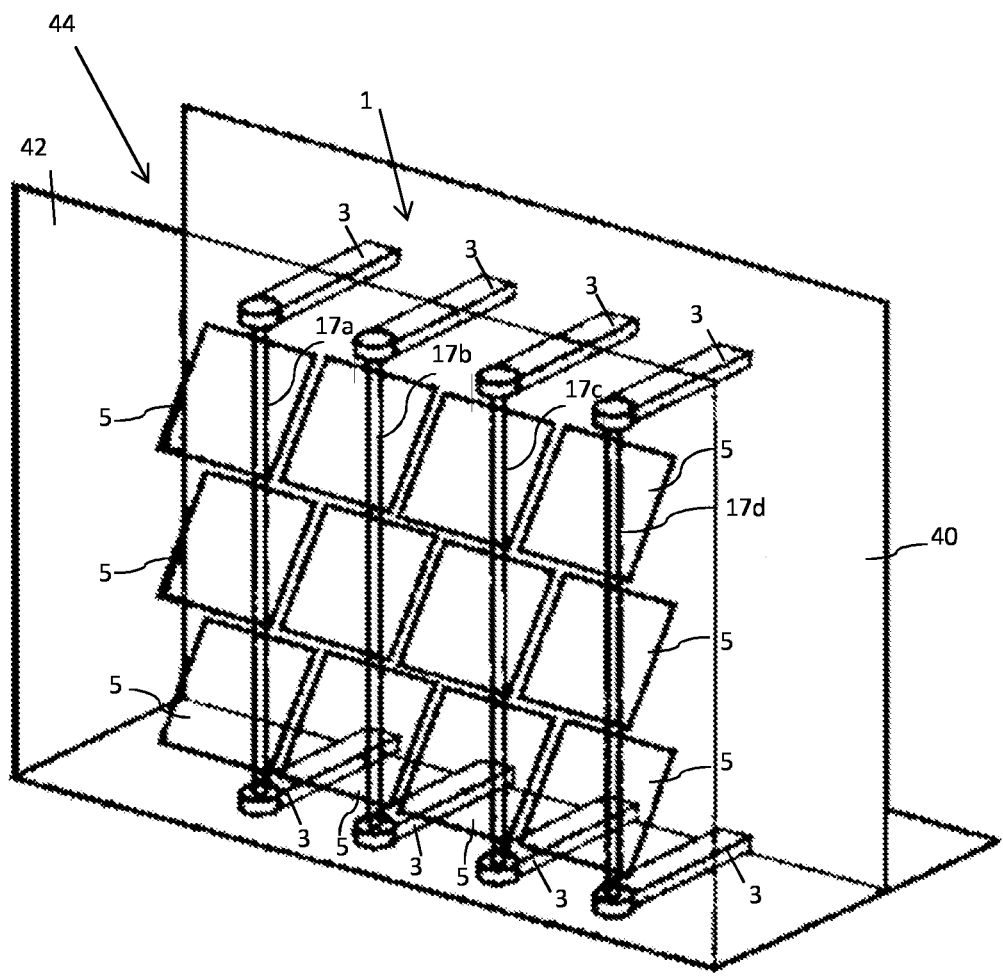
FIG. 4 depicts schematically a façade portion of a building including a solar shading module according to another embodiment of the invention in perspective view.

FIG. 4 depicts schematically a façade portion of a building including an inner wall 40 and an outer wall 42, both preferably made of a transparent material, e.g. glass. This provides a space 44 in between the inner and outer wall in which a solar shading module 1 according to another embodiment of the invention is positioned. The embodiment is similar to the embodiment of FIGS. 1, 2 and 3A to 3C in that it comprises an array of shading panels 5 connected to a respective support column 17a, 17b, 17c and 17d such that when all shading panels are positioned in a single plane, said plane is at a distance but parallel to a plane spanned by the support columns.

The support columns are rotatably supported by frame parts 3 which in turn are connected to the inner wall 40. The frame parts 3 may further accommodate a solar tracking device for rotating the shading panels about two orthogonal axes.

Figure 5:
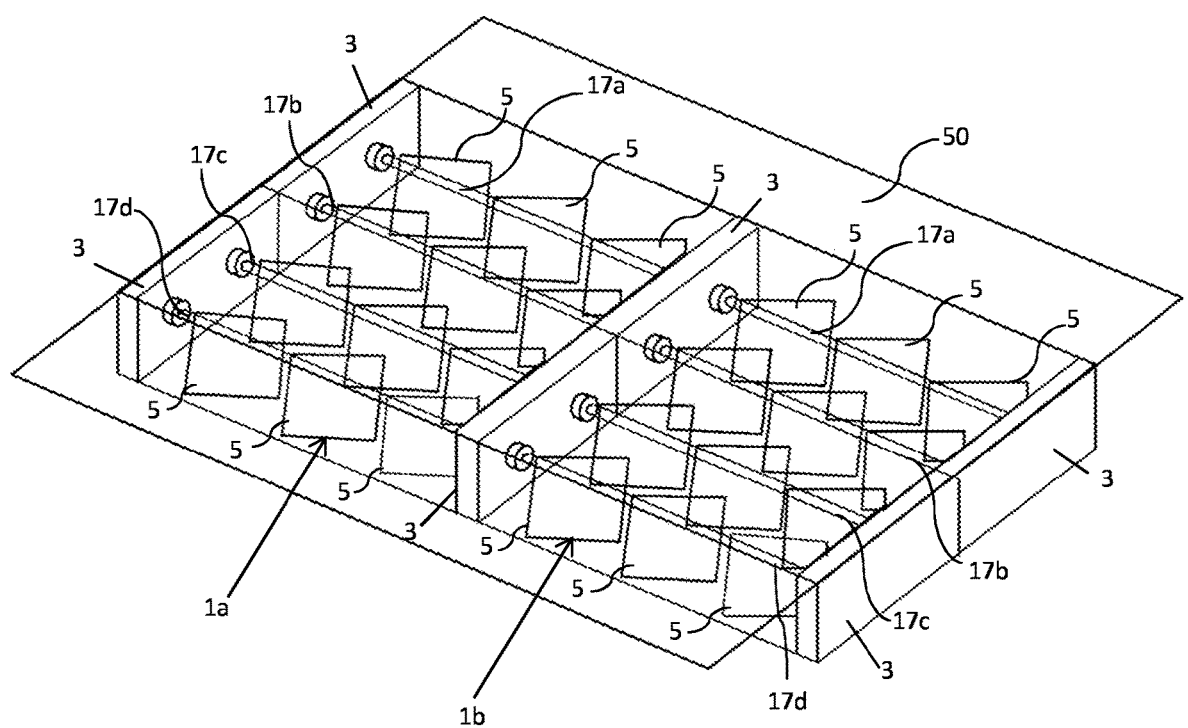
FIG. 5 depicts schematically a roof portion of a building including a solar shading module according to a further embodiment of the invention in perspective view.

FIG. 5 depicts schematically a roof portion of a building including a transparent, e.g. glass, roof 50. Below the roof 50, two solar shading module 1a, 1b according to a further embodiment of the invention are provided. The modules are similar to the embodiment of FIGS. 1, 2 and 3A to 3C in that it comprises an array of shading panels 5 connected to a respective support column 17a, 17b, 17c and 17d such that when all shading panels are positioned in a single plane, said plane is at a distance but parallel to a plane spanned by the support columns.

The support columns are rotatably supported by frame parts 3 which may be cross beams supporting the roof 50. The frame parts 3 may further accommodate a solar tracking device for rotating the shading panels about two orthogonal axes.

Figure 6:
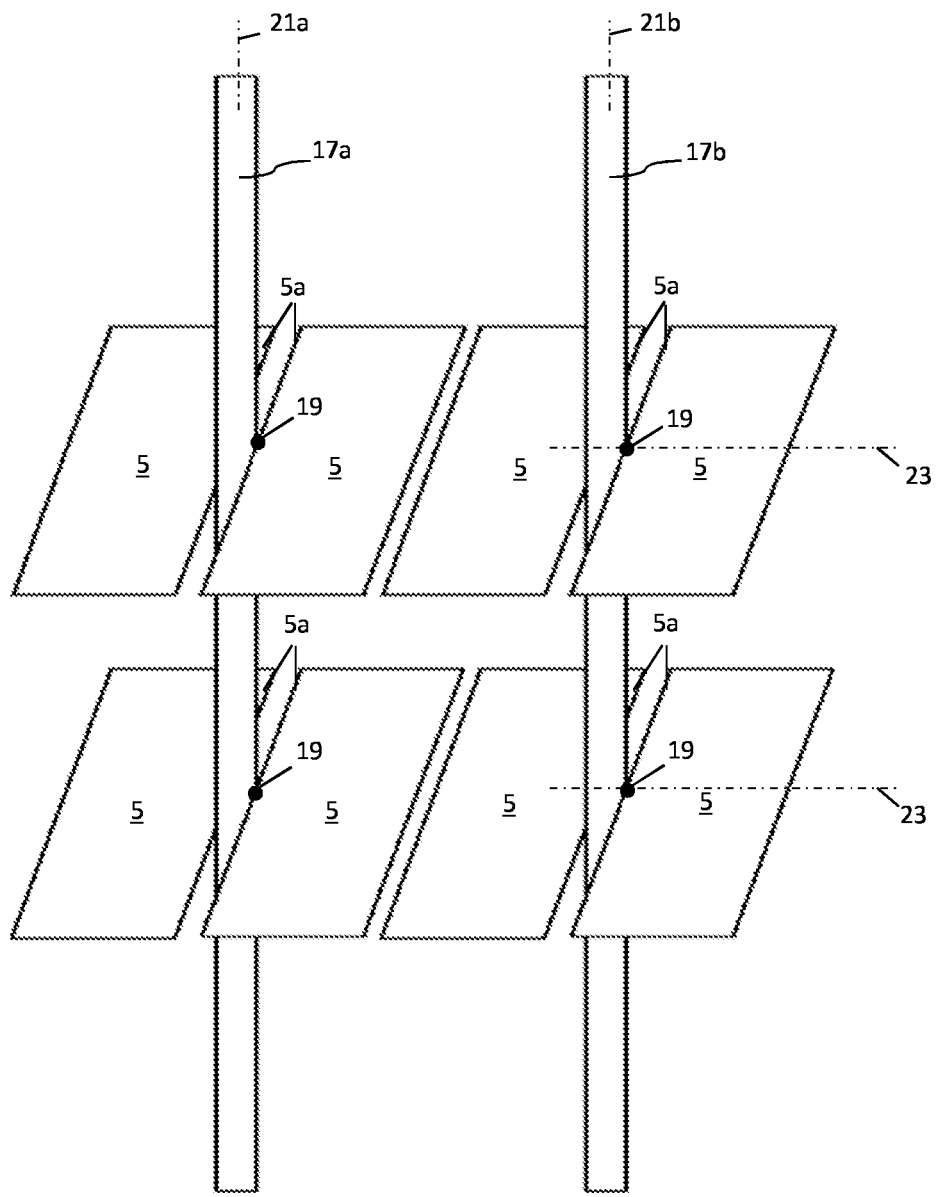
FIG. 6 depicts a part of a solar shading module according to yet another embodiment of the invention.

FIG. 6 depicts a part of a solar shading module according to yet another embodiment of the invention. Shown are two support columns 17a, 17b, each carrying four shading panels 5', 5" to form an array of 4 by 2 shading panels. Connecting elements 19 are provided connecting a side 5a of each shading panel 5', 5" to a corresponding support column 17a, 17b such that in case the shading panels are all positioned in a single plane (not shown in FIG. 6), the support columns are also positioned in said plane. To allow the unobstructed rotation of the shading panels 5', 5" about the longitudinal axes 21a, 21b of the support columns and about the rotation axes 23, a first set of shading panels 5' is connected to the support column 17a and a second set of shading panels 5" is connected to the support column 17b thereby having two shading panels in between adjacent support columns allowing the free rotation of the shading panels about the longitudinal axes 21a, 21b independent of the orientation of the shading panels about the rotation axes 23.

Although in the drawings, usually only a single solar shading module has been depicted, several modules can be combined to form a single solar shading system, where adjacent solar shading modules may share frame parts, and parts of the solar tracking system such as motors and control systems.

Although the specification and claims talk about the in plane distance between adjacent shading panels and between shading panels and adjacent support columns being substantially minimal without causing interference during movement of the shading panels by the solar tracking system may alternatively be defined as the distance being maximum 50 mm, preferably maximum 25 mm, more preferably maximum 10 mm, even more preferably maximum 5 mm, and most preferably at most 1 mm. It may also be defined as the minimum distance being at most 50 mm, preferably at most 25 mm, more preferably at most 10 mm, even more preferably at most 5 mm, and most preferably at most 1 mm during movement of the shading panels in normal use.

Substantially minimal does not exclude that the in plane distance between shading panels seen in the length direction needs to be the same as the in plane distance between shading panels seen in the width direction. It is possible, depending on the geographical location and orientation of the solar shading module, that the in plane distance in the width direction can be larger than the in plane distance in the length direction while obtaining the same shading result.

As a result thereof, the substantially minimal in plane distance may alternatively be defined as the distance being maximum 10% of the corresponding dimension of the shading panel, i.e. seen in length or width direction.

The invention claimed is:

1. A solar shading module for shading direct sunlight, said module comprising:
    a frame;
    an array of m×n shading panels; and
    a solar tracking system configured to move the shading panels in order to follow the sun,
   wherein m and n are integer values larger than 1,
   wherein the shading panels have a length, a width and a thickness, said length being equal to or larger than the width, and said width being at least five times larger than said thickness,
   wherein the shading panels have a back side to face away from the sun, and a front side opposite the back side with a front surface to face towards the sun, said front surface extending in a length direction and a width direction and defining a normal of the shading panel perpendicular to the front surface,
   wherein the shading panels are configured to shade at least visible radiation that is incident to the front surface and parallel to the normal of the respective shading panels,
   wherein the frame comprises one or more support columns, each support column supporting multiple shading panels,
   wherein the solar tracking system is configured to rotate the shading panels about a longitudinal axis of the corresponding support columns,
   wherein the solar tracking system is further configured to rotate the shading panels about a rotation axis perpendicular to the longitudinal axis of the corresponding support columns and perpendicular to the normal of the respective shading panels,
   wherein the shading panels each comprise a connecting element to connect the respective shading panel to a corresponding support column in one of the following ways:
    a) in which the connecting element connects a side of the respective shading panel to the corresponding support column such that in case the shading panels are all positioned in a single plane, the support columns are also positioned in said plane, wherein in case of more than two support columns are provided a first set of shading panels and a second set of shading panels are arranged in between adjacent support columns, wherein the first set of shading panels is connected to one of the adjacent support columns and the second set of shading elements connected to the other one of the adjacent support columns, or
    b) in which the connecting element extends away from the respective shading panel in the thickness direction of the shading panel such that in case the shading panels are all positioned in a single plane, said plane is at a distance but parallel to a plane spanned by the support columns.

2. A solar shading module according to claim 1, wherein the shading panels are connected to the one or more support columns using connection type a), and wherein the in plane distance between shading panels and the in plane distance between shading panels and adjacent support columns are maximum 50 mm without causing interference during movement of the shading panels by the solar tracking system.

3. A solar shading module according to claim 1, wherein the shading panels are connected to the one or more support columns using connection type b), and wherein the in plane distance between shading panels is maximum 50 mm without causing interference during movement of the shading panels by the solar tracking system.

4. A solar shading module according to claim 1, wherein one or more of the shading panels comprise a solar panel to transfer at least visible radiation incident to the solar panel into electricity and/or heat.

5. A solar shading module according to claim 1, wherein one or more of the shading panels comprise a solar panel including an optical element to focus at least visible radiation incident to the lens and parallel to the normal of the shading panel on a photovoltaic cell to transfer the at least visible radiation into electricity and/or heat.

6. A solar shading module according to claim 1, wherein the shading panels are configured to allow the passage of radiation with the exception of at least visible radiation that is incident to the front surface and parallel to the normal of the respective shading panels.

7. A solar shading module according to claim 1, wherein the shading panels comprise resilient elements that in case the shading panels are all positioned in a single plane engage with adjacent shading panels and/or engage with the resilient elements of adjacent shading panels in order to prevent the passage of direct sunlight in between the shading panels.

8. A solar shading module according to claim 1, wherein the shading panels are connected to the one or more support columns using connection type a), and wherein the shading panels comprise a resilient element engaging with the support column they are connected to in order to prevent the passage of direct sunlight in between the shading panels and the support column they are connected to.

9. A solar shading module according to claim 1, wherein the solar tracking system comprises a first motor and a first transmission system between the first motor and the one or more support columns, so that all support columns are rotatable about their longitudinal axis by driving the first motor thereby rotating the shading panels connected thereto.

10. A solar shading module according to claim 1, wherein the solar tracking system comprises a second motor and a second transmission system between the second motor and the shading panels, so that all shading panels are rotatable about the rotation axis perpendicular to the respective longitudinal axis of the support column and the normal of the shading panel by driving the second motor.

11. A solar shading module according to claim 10, wherein the second transmission system comprises a part that is provided inside the one or more support columns.

12. A solar shading module according to claim 1, wherein the shading panels are configured to shade the at least visible radiation that is incident to the front surface and parallel to the normal of the respective shading panels by absorbing, reflecting and/or redirecting said at least visible radiation.

13. A glazed structure comprising one or more solar shading modules according to claim 1.

14. A glazed structure according to claim 13, comprising multiple solar shading modules according to claim 1, wherein the multiple solar shading modules are arranged next to each other and are configured to cooperate to act as a single solar shading system.

15. A glazed structure according to claim 13, wherein the glazed structure is a façade of a building, a roof of a building or a light or sound barrier next to a highway.

16. A glazed structure according to claim 13, wherein the shading panels are connected to the one or more support columns using connection type a), and wherein the in plane distance between shading panels and the in plane distance between shading panels and adjacent support columns are substantially minimal without causing interference during movement of the shading panels by the solar tracking system.

17. A glazed structure according to claim 13, wherein the shading panels are connected to the one or more support columns using connection type b), and wherein the in plane distance between shading panels is substantially minimal without causing interference during movement of the shading panels by the solar tracking system.

18. A building comprising one or more solar shading modules according to claim 1.

19. A building according to claim 18, comprising multiple solar shading modules wherein the multiple solar shading modules are arranged next to each other and are configured to cooperate to act as a single solar shading system.

20. A building according to claim 18, wherein the solar shading modules are arranged in a space of the building separate from normal user areas of the building allowing to store heat that is generated by the shading panels for thermal harvesting purposes.

21. A building according to claim 18, wherein the shading panels are connected to the one or more support columns using connection type a), and wherein the in plane distance between shading panels and the in plane distance between shading panels and adjacent support columns are substantially minimal without causing interference during movement of the shading panels by the solar tracking system.

22. A building according to claim 18, wherein the shading panels are connected to the one or more support columns using connection type b), and wherein the in plane distance between shading panels is substantially minimal without causing interference during movement of the shading panels by the solar tracking system.

23. A method for operating a solar shading module comprising:
　a frame;
　an array of m×n shading panels; and
　a solar tracking system configured to move the shading panels in order to follow the sun,
　　wherein m and n are integer values larger than 1,
　　wherein the shading panels have a length, a width and a thickness, said length being equal to or larger than the width, and said width being at least five times larger than said thickness,
　　wherein the shading panels have a back side to face away from the sun, and a front side opposite the back side with a front surface to face towards the sun, said front surface extending in a length direction and a width direction and defining a normal of the shading panel perpendicular to the front surface,
　　wherein the shading panels are configured to shade at least visible radiation that is incident to the front surface and parallel to the normal of the respective shading panels,
　　wherein the frame comprises one or more support columns, each support column supporting multiple shading panels,
　　wherein the solar tracking system is configured to rotate the shading panels about a longitudinal axis of the corresponding support columns,
　　wherein the solar tracking system is further configured to rotate the shading panels about a rotation axis perpendicular to the longitudinal axis of the corresponding support columns and perpendicular to the normal of the respective shading panels, wherein the shading panels each comprise a connecting element to connect the respective shading panel to a corresponding support column in one of the following ways:

a) in which the connecting element connects a side of the respective shading panel to the corresponding support column such that in case the shading panels are all positioned in a single plane, the support columns are also positioned in said plane, wherein in case of more than two support columns are provided a first set of shading panels and a second set of shading panels are arranged in between adjacent support columns, wherein the first set of shading panels is connected to one of the adjacent support columns and the second set of shading elements connected to the other one of the adjacent support columns, or b) in which the connecting element extends away from the respective shading panel in the thickness direction of the shading panel such that in case the shading panels are all positioned in a single plane, said plane is at a distance but parallel to a plane spanned by the support columns, wherein the method includes the step of controlling the position of the shading panels such that the normal of the shading panels points towards the sun.

* * * * *